P. E. FERRERO.
PROPELLER.
APPLICATION FILED SEPT. 17, 1915.

1,218,386.

Patented Mar. 6, 1917.

Witnesses
P. J. Gathmann
R. J. Hulsizer

Inventor
Paul E. Ferrero
By Byrnes Townsend & Brickenstein
Attorney

UNITED STATES PATENT OFFICE.

PAUL E. FERRERO, OF PITTSBURGH, PENNSYLVANIA.

PROPELLER.

1,218,386.   Specification of Letters Patent.   Patented Mar. 6, 1917.

Application filed September 17, 1915. Serial No. 51,167.

*To all whom it may concern:*

Be it known that I, PAUL E. FERRERO, a citizen of the United States, residing at Pittsburgh, in the county of Allegheny and State of Pennsylvania, have invented certain new and useful Improvements in Propellers, of which the following is a specification.

This invention relates to screw propellers, and particularly to those of the disk type having a variable pitch.

It has for its object the provision of a propeller in which the ratio of the pitch of the leading face to that of the trailing face of each blade is constant, regardless of the diameter or pitches selected.

It has for a futher object the provision of a propeller in which the front, central, and rear portions of each blade have curvatures bearing definite relations to each other and which occupy definite proportions of the blade.

It has for a further object the provision of a propeller in which the fluid acted upon receives at the leading edge only a slight acceleration from that of feed, this acceleration being increased at the rear part of the blade.

A further object is to provide the rear portion of each blade with a considerable rake which, in combination with fixed areas and curvatures, tends to overcome the centrifugal action of the water and cause the water to leave the propeller in lines parallel to the axis, or, if the rake is sufficient, to converge in lines toward a point on the axis of the propeller rearwardly extended.

With these objects in view, the invention is set forth in the accompanying drawings, in which,—

Figure 1:
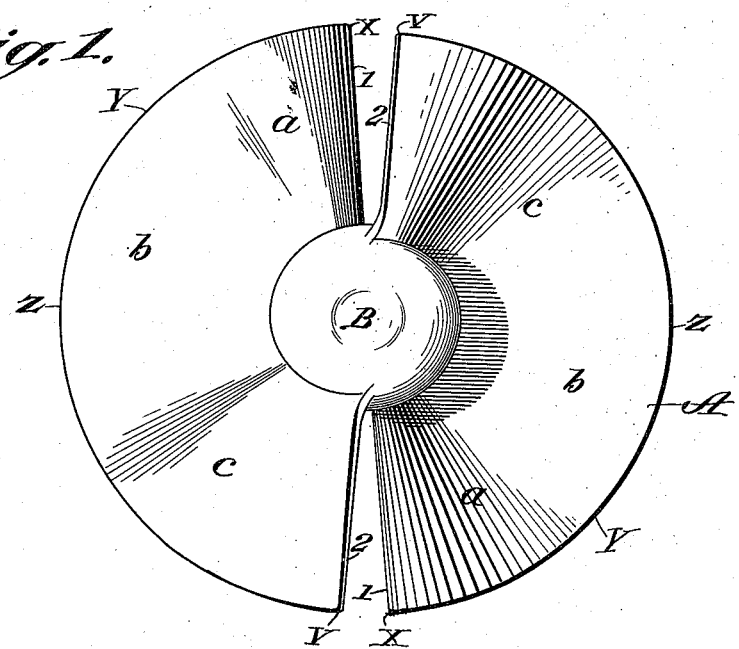
Figure 1 is an elevation of the propeller, looking toward the working face.
Figure 2:
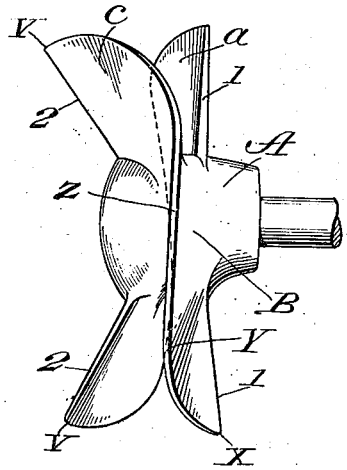
Fig. 2 is a side elevation of the propeller.
Figure 3:
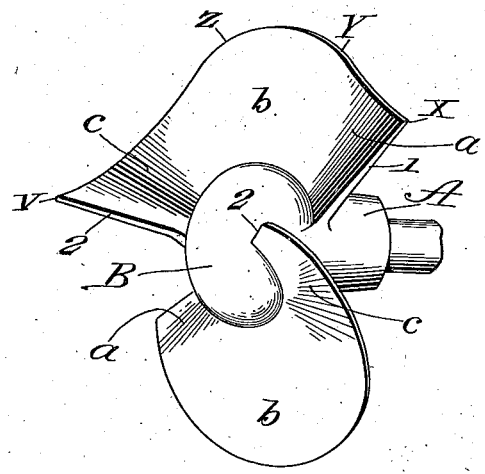
Fig. 3 is a perspective view from the rear.

As shown in the drawings, A represents a two-bladed disk-propeller with blades mounted on a hub B having leading edges 1, 1 and trailing edges 2, 2. The leading edges 1 have a forward rake of 15°, as shown, while the trailing edges have a rearward rake of 30°. Each blade comprises a leading portion $a$, $a$, central portion $b$, and a trailing portion $c$. In each blade the leading portion $a$ occupies about one quarter of the blade, the central portion $b$ one quarter, and the trailing portion $c$ one-half, as denoted approximately in Fig. 1, by the letters $xy$, $yz$, $zv$, respectively. Referring to Fig. 2, it will be seen that the leading portion $a$ of each blade is slightly convex (as viewed from the rear), the central portion $b$ is substantially flat, and the trailing portion $c$ is considerably concave. The curvature of portion $c$ is twice that of portion $a$. The blade has a forward rake of 15° at the leading edge 1, which rake varies from 15° to 0° at the point where portion $a$ joins portion $b$, which has no rake at all, being perpendicular. From the rear part of portion $b$ to the trailing edge of the blade, the rake varies from 0° to a 30° rearward rake at edge 2.

As regards its operation, my propeller is designed to combine features which cause it to work according to certain well-defined principles of screw-propellers. It is well known that, all other things being equal, the efficiency of a propeller increases up to the point where its area equals the area of the column of water acted upon. For this reason the area of my propeller is constant for any given diameter regardless of pitch or rake. My propeller blades may be cast or may be pressed from flat plates.

It is also known that loss of work in propellers is due largely to the fact that the water is given a sudden change in velocity from feed to discharge. This is eliminated largely by variable pitch screws, productive of countering currents or streams, peculiar to this device. When a propeller is designed to act upon the particles of water at first with a velocity equal to the velocity of feed (the speed of the water entering the propeller with respect to the same) and gradually increases its velocity up to the velocity of discharge with a corresponding gradation of recoil on the blade face, then the loss of work is the least possible and the limit of efficiency is reached, other things being equal. I have found that this result may be very properly effected by giving the leading face $a$, a slight convex curve, the central face $b$ a flat face with a small uniform pitch near the hub, and the trailing face $c$ a concave curve which is twice that of the leading face $a$. This ratio is maintained in all blades, regardless of pitch. The diameter and pitch used will, of course, vary with the conditions of the service required.

It is also known that screw propellers with variable pitches tend to accelerate and rotate the water, and that all propellers tend to throw off water by centrifugal action. To counteract this action, while maintaining the above-mentioned advantages of a gaining pitch screw, I give the leading edge *a* a forward rake of 15°, the central portion is perpendicular, and the rear portion *c*, because of its greater curvature, is given a rearward rake of 30°. These rakes, in combination with a blade area that in no radius is in excess of that of the water engaged, are designed to counteract the centrifugal tendency of the water, and to derive from it the maximum of recoil with the minimum of shock and vibration.

I claim:—

1. A variable pitch screw propeller in which the area of the propeller is substantially equal to the area of the column of water engaged, the pitch of the leading face bearing a constant curve and surface ratio less than unity to that of the trailing face, the curvature of the leading face being reversed to that of the trailing face.

2. A variable pitch screw propeller in which the area of the propeller is substantially equal to the area of the column of water engaged, and in the blades of which the pitch of the trailing face is twice that of the leading face, the curvature of the leading face being reverse to that of the trailing face.

3. A disk screw propeller in which the area of the propeller is substantially equal to the area of the column of water engaged, the pitch of the leading face of each blade being one-half that of the trailing face, the curvature of the leading face being reverse to that of the trailing face.

4. In a screw propeller, a hub, blades mounted upon said hub, the area of said blades being equal substantially to that of the column of water engaged, each blade having a leading face portion slightly convex with respect to the water engaged, and the leading edge having a forward rake of 15°, a central face portion substantially flat and perpendicular, and a trailing face portion with a concave curvature raked at an angle rearwardly of 30° at the trailing edge, the ratio of the pitch of the trailing face to that of the leading face being two to one.

In testimony whereof I affix my signature.

PAUL E. FERRERO.